(12) United States Patent
Skobeltsyn et al.

(10) Patent No.: US 9,576,578 B1
(45) Date of Patent: Feb. 21, 2017

(54) CONTEXTUAL IMPROVEMENT OF VOICE QUERY RECOGNITION

(71) Applicant: Google Inc., Mountain View, CA (US)

(72) Inventors: Gleb Skobeltsyn, Kilchberg Zurich (CH); Alexandru Ovidiu Dovlecel, Zurich (CH); Carl-Anton Ingmarsson, Zurich (CH); Martin Baeuml, Hedingen Zurich (CH); Behshad Behzadi, Zurich (CH); Dmitry Osmakov, Zurich (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/824,902

(22) Filed: Aug. 12, 2015

(51) Int. Cl.
*G10L 15/26* (2006.01)
*G10L 15/08* (2006.01)
*G06F 17/30* (2006.01)

(52) U.S. Cl.
CPC ......... *G10L 15/26* (2013.01); *G06F 17/30684* (2013.01); *G10L 15/08* (2013.01)

(58) Field of Classification Search
None
See application file for complete search history.

(56) References Cited

U.S. PATENT DOCUMENTS

| | | | | |
|---|---|---|---|---|
| 7,865,362 B2 * | 1/2011 | Braho | ...................... | G10L 15/08 704/251 |
| 8,521,526 B1 | 8/2013 | Lloyd et al. | | |
| 2004/0186714 A1 * | 9/2004 | Baker | ...................... | G10L 15/08 704/236 |
| 2009/0037174 A1 * | 2/2009 | Seltzer | ................ | G10L 15/1815 704/251 |
| 2011/0153324 A1 * | 6/2011 | Ballinger | ................ | G10L 15/30 704/235 |
| 2012/0245919 A1 * | 9/2012 | Aradilla | ................ | G10L 15/187 704/2 |
| 2012/0303267 A1 * | 11/2012 | Shen | .................... | G10L 15/1815 701/427 |
| 2013/0080177 A1 * | 3/2013 | Chen | ....................... | G10L 15/26 704/275 |
| 2013/0282645 A1 * | 10/2013 | Culbertson | ............ | G06N 7/005 706/52 |
| 2015/0179169 A1 * | 6/2015 | John | ...................... | G10L 15/187 704/257 |
| 2016/0004502 A1 * | 1/2016 | Winkelman | ............ | G06F 3/167 704/254 |
| 2016/0035347 A1 * | 2/2016 | Agarwal | ............. | G10L 15/1815 704/254 |

* cited by examiner

*Primary Examiner* — Douglas Godbold
(74) *Attorney, Agent, or Firm* — Fish & Richardson P.C.

(57) ABSTRACT

Methods, including computer programs encoded on a computer storage medium, for collaborative language model biasing. In one aspect, a method includes: obtaining (i) one or more initial candidate transcriptions, and (ii) one or more terms that are associated with a context; selecting one or more of the terms that are associated with the context, and that (i) do not occur in the candidate transcriptions, and (ii) are indicated as phonetically similar to one or more terms that do occur in the initial candidate transcriptions; generating one or more additional candidate transcriptions based on the (i) initial candidate transcriptions, and (ii) the selected terms; and providing the one or more additional candidate transcriptions to an automated speech recognizer.

19 Claims, 3 Drawing Sheets

FIG. 3

CONTEXTUAL IMPROVEMENT OF VOICE QUERY RECOGNITION

FIELD

The present specification relates to automated speech recognition.

BACKGROUND

Speech recognition refers to the transcription of spoken words into text using an automated speech recognizer (ASR). In traditional ASR systems, received audio is converted into computer-readable sounds, which are then compared to a dictionary of words that are associated with a given language.

SUMMARY

In general, one innovative aspect of the subject matter described in this specification can be embodied in methods that improve voice recognition accuracy by generating multiple transcription candidates for a voice query based on receiving data indicating a user context. For instance, user context may be extracted from various data sources such as, for example, previously submitted search queries, user activity, location information, or from a profile that indicates user preferences. The extracted user context may be used to generate additional transcription candidates that are associated with the context and include terms that are phonetically similar to terms included in an initial candidate transcription. The additional candidate transcriptions may be used to bias recognition of the voice query to improve the likelihood of generating an accurate transcription based on the user context.

Implementations may include one or more of the following features. For example, in some implementations, a method includes: obtaining (i) one or more initial candidate transcriptions, and (ii) one or more terms that are associated with a context; selecting one or more of the terms that are associated with the context, and that (i) do not occur in the candidate transcriptions, and (ii) are indicated as phonetically similar to one or more terms that do occur in the initial candidate transcriptions; generating one or more additional candidate transcriptions based on the (i) initial candidate transcriptions, and (ii) the selected terms; and providing the one or more additional candidate transcriptions to an automated speech recognizer.

In some implementations, the method includes: obtaining (i) audio data encoding an utterance, and (ii) data indicating a context; obtaining one or more initial candidate transcriptions based on the audio data; obtaining one or more terms that are associated with the context; selecting one or more of the terms that are associated with the context, and that (i) do not occur in the candidate transcriptions, and (ii) are indicated as phonetically similar to one or more terms that do occur in the initial candidate transcriptions; generating one or more additional candidate transcriptions based on the (i) initial candidate transcriptions, and (ii) the selected terms; generating a score for each of the initial candidate transcriptions and the additional candidate transcriptions based on the audio data; selecting a particular candidate transcription, from among the initial candidate transcriptions and the additional candidate transcriptions, based at least on the score; and providing the particular candidate transcription for output.

In some implementations, the methods include: obtaining, by an automated speech recognizer, audio data encoding an utterance; obtaining, by the automated speech recognizer, one or more initial candidate transcriptions based on the audio data; receiving, by the automated speech recognizer, one or more additional candidate transcriptions that each include a term that (i) does not occur in the candidate transcriptions, and (ii) are indicated as phonetically similar to one or more terms that do occur in the initial candidate transcriptions; after receiving the one or more additional candidate transcriptions, generating, by the automated speech recognizer, a score for each of the initial candidate transcriptions and the additional candidate transcriptions based on the audio data; selecting, by the automated speech recognizer, a particular candidate transcription, from among the initial candidate transcriptions and the additional candidate transcriptions, based at least on the score; and providing, by the automated speech recognizer, the particular candidate transcription for output.

Other versions include corresponding systems, and computer programs, configured to perform the actions of the methods encoded on computer storage devices.

One or more implementations may include the following optional features. For example, in some implementations, the context includes a user location.

In some implementations, the one or more terms associated with the user location includes entity terms representing names of locations.

In some implementations, the one or more terms that are associated with the context include entity terms that are included in one or more previously submitted queries.

In some implementations, the methods additionally include biasing, by an automated speech recognizer, speech recognition of the utterance using the particular candidate transcription.

In some implementations, the one or more additional candidate transcriptions include corrected transcriptions for each of the one or more candidate transcriptions that are identified as incorrect transcriptions for the utterance.

In some implementations, selecting one or more of the terms that are associated with the context, includes: comparing waveforms associated with one or more of the terms that are associated with the context and waveforms associated with one or more of the terms that occur in the initial candidate transcriptions; and determining, based on comparing waveforms associated with one or more of the terms that are associated with the context and waveforms associated with one or more of the terms that occur in the initial candidate transcriptions, that the one or more terms that are associated with the context are phonetically similar to one or more terms that occur in the initial candidate transcriptions.

In some implementations, the context includes (i) a user location, or (ii) one or more terms associated with the user location.

In some implementations, the one or more additional candidate transcriptions include corrected transcriptions for each of the one or more candidate transcriptions that are identified as incorrect transcriptions for the utterance.

In some implementations, selecting the particular candidate transcription from among the initial candidate transcriptions and the additional candidate transcriptions, includes: comparing the score for each of the initial candidate transcriptions and the additional candidate transcriptions; determining, based at least on comparing the score for each of the initial candidate transcriptions and the additional candidate transcriptions, that a score for a particular candidate transcription indicates a higher likelihood than the score for each of the initial candidate transcriptions that the particular candidate transcription represents an accurate transcription of the audio date; and selecting the particular transcription for output.

In some implementations, the additional candidate transcriptions do not represent an output of the automated speech recognizer.

In some implementations, the term that (i) does not occur in the candidate transcriptions, and (ii) are indicated as phonetically similar to one or more terms that do occur in the initial candidate transcriptions represents an entity term.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

In the drawings, like reference numbers represent corresponding parts throughout.

DETAILED DESCRIPTION

Voice queries are often misrecognized because they contain rare terms that are relevant only in specific user contexts that include particular user locations, users, time or combinations of context data. General voice recognition techniques that do not include context data often fail to distinguish between terms that are commonly used in different user contexts, and as a result, provide inaccurate transcriptions of a voice query.

Accordingly, techniques described in this specification improve voice recognition accuracy by generating multiple transcription candidates for a voice query based on receiving data indicating a user context. For instance, user context may be extracted from various data sources such as, for example, previously submitted search queries, user activity, location information, or from a profile that indicates user preferences. The extracted user context may be used to generate additional transcription candidates that are associated with the context and include terms that are phonetically similar to terms included in an initial candidate transcription. The additional candidate transcriptions may be used to bias recognition of the voice query to improve the likelihood of generating an accurate transcription based on the user context.

Figure 1:
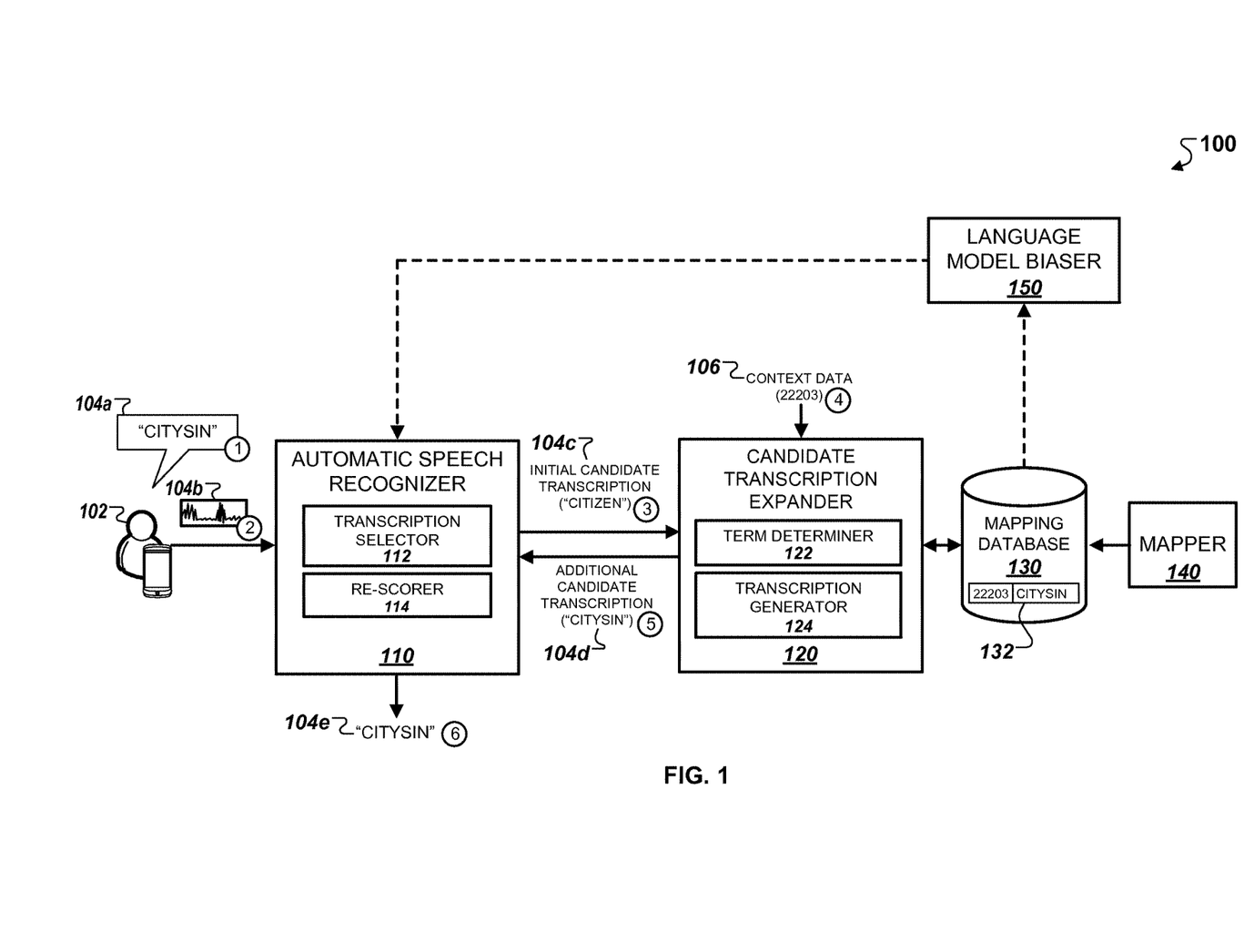
FIG. 1 illustrates an exemplary system that may be used to improve voice query recognition using user context.

FIG. 1 illustrates an exemplary system 100 that may be used to improve voice query recognition using user context. In general, a user 102 provides a voice query 104a, encoded as audio data 104b, to the system 100, which then generates an initial candidate transcription 104c. The system 100 then receives context data 106, which is used to generate additional candidate transcription 104d, and generate a recognition output 104e based on the additional candidate transcription 104d.

Briefly, the system 100 may include an automated speech recognizer (ASR) 110 that includes a transcription selector 112 and a re-scorer 114, a candidate transcription expander 120 that includes a term determiner 122 and a transcription generator 124, a mapping database 130 that includes a context mapping 132, a mapper 140, and a language model biaser 150. More particular details about the operations performed by the system 100 are described below.

In more detail, the user 102 may initially provide a voice query 104a, which is then encoded as audio data 104b. As shown in the example in FIG. 1, the user 102 may provide a voice query that includes the term "CITYSIN," which is the name of a restaurant in Washington, D.C.

The ASR 110 may receive the audio data 104b encoding the voice query 104a and generate the initial candidate transcription 104c for the audio data 104b. As shown in the example in FIG. 1, the ASR 110 generates an initial candidate transcription "CITIZEN" for the audio data 104b based on the inferred phonetics of the voice query "CITYSIN." In this example, the ASR 110 generates the initial candidate transcription as "CITIZEN" because the acoustic model and the language model indicate that this is the most likely recognition candidate without receiving data indicating a user context. For instance, as shown, the ASR 110 may use the acoustic model and the language model to generate an incorrect initial candidate transcription because the language model may indicate that "CITIZEN" is the most likely transcription for the utterance "SI-TE-ZE-EN" (not shown).

The candidate transcription expander 120 may receive the initial candidate transcription and additionally receive context data that indicates a user context. For instance, the context data 106 may include data from previous user sessions such as previous search engine results from previous queries such as, for example, knowledge panels, lists, answers, or other types of information related to previous queries. In other instances, the context data may include recently clicked webpages, screen tracking data that indicates user behavior on a user interface such as, for example, click-tracking activity, amount of time spent on particular screens, or other types of user interaction. In such instances, the context data 106 may include n-grams that are associated with the user activity data.

The context data 106 may additionally indicate a current user location based on a global positioning system (GPS) signal from a user device, and information related to the current user location. For example, the context data 106 may include terms associated with the current user location, such as names of nearby establishments, popular queries associated with the current user location, or previously submitted queries when the user 102 was last nearby the current location.

In some implementations, the context data 106 may additionally or alternatively be extracted from a user profile that indicates user preferences that are determined based on the frequency of previously submitted voice queries, for example, commonly searched restaurants. The user profile may also indicate previous searches that include entity terms such as names of celebrities or popular locations, or different types of user activity data that represent user preferences such as, for example, "pinning" a location or setting a webpage as a "favorite."

As shown in the example in FIG. 1, the candidate transcription expander 120 receives context data 106 that includes a zip code, "22203," which indicate a current user location. The term determiner 122 of the candidate transcription expander 120 then uses the current user location to generate a list of terms that are associated with the current user location indicated by the context data 106. For instance, the term determiner 122 accesses the mapping database 130, which includes the context mapping 132 that maps particular terms to a particular context. As shown in FIG. 1, the zip code, "22203" is mapped to the term "CITYSIN."

In some implementations, the mapping database 130 may periodically be updated with information transmitted from the mapper 140, which generates new context mappings 132 for particular contexts associated with the user 102. The mapper 140 may aggregate received context data from previous user sessions to associate particular terms with particular contexts. For instance, the mapper 140 may analyze user activity data that indicates common terms that are used by the user 102 when he/she is within a particular context in order to generate the context mappings 132. In other instances, the mapper 140 may aggregate data received from multiple users to determine terms that are commonly used by multiple users when they are within a shared context. For example, the mapper 140 may aggregate data from users within a location to determine shared terms from queries submitted all users that are within the location. Based on aggregating the data, the mapper 140 may then generate a set of context mappings 132 that map the shared terms to the location.

In some implementations, the mapping database 130 additionally or alternatively send the context mapping 132 to the language model biaser 150 to bias a baseline language model that used by the ASR 110 to generate candidate transcriptions for voice query 104a or subsequent voice queries that are similar to the voice query 104a or are associated with the context indicated by the context data 106. For example, the language model biaser 150 may positively bias the baseline language model such that there is an increased probability that the terms mapped to the context within context mapping 132 will be included in a subsequent transcription candidate. In such examples, the context indicated by the context data 106 may be used to obtain, based on the terms associated with the context indicated by the context data 106, the biased language model that is used by the ASR 110 to generate candidate transcriptions for the voice query 104a, or subsequent voice queries that may be similar to the voice query 104a or associated with the context indicated by the context data 106.

The transcription generator 124 uses the list of terms that are associated with the context indicated by the context data 106 to generate alternative candidate transcriptions for the audio data 104a. For instance, the transcription generator 124 may initially compare the terms included in the list of terms that are associated with the context indicated by the context data 106 against the terms included in the initial transcription candidate 104c. Based on the comparison, transcription generator 124 may then select particular terms that do not occur in the initial candidate transcription 104c and are indicated as phonetically similar to terms that do occur in the initial candidate transcription 104c. For example, as indicated in FIG. 1, the transcription generator 124 may select the term "CITYSIN" because it associated with the zip code "22203" included in the context data 106 and because "CITYSIN" is phonetically similar to "CITIZEN," which is included in the initial candidate transcription 104c.

The transcription generator 124 generates the additional candidate transcription 104d based on the initial candidate transcription 104d and the selected terms from the list of terms associated with the context indicated by the context data 106. For instance, the additional candidate transcriptions 104d may represent an alternative transcription of the audio data 104b that were not initially generated by the ASR 110. In other instances, the alternative candidate transcription 104d may be a corrected transcription for an incorrect initial candidate transcription 104c for the audio data 104b. For example, as shown in FIG. 1, the additional candidate transcription 104d, "CITYSIN," is the correct transcription of the audio data 104b, which encodes the voice query 104a "CITYSIN" of the user 102. In such an example, the alternative candidate transcription 104d is generated based on the context data 106 indicating the zip code 22203, which is associated with the restaurant CITYSIN in Washington, D.C.

The ASR 110 receives the additional candidate transcription 104d and then selects a particular candidate transcription to output. For instance, in some implementations, the ASR 110 may initially generate a confidence score for each of the initial candidate transcription 104c and the additional candidate transcription 104d based on audio data 104b. The confidence score may represent the likelihood that each particular candidate transcription represents an accurate transcription of the voice query 104a. As shown in the example in FIG. 1, the ASR 110 determines, based on both the audio data 104b and the context data 106, a low confidence score for the initial candidate transcription 104c "CITIZEN" because of the current user location indicated by zip code in the context data 106. Alternatively, the ASR 110 determines a high confidence score for the alternative candidate transcription 104d "CITIZEN" because it is phonetically similar to the audio data 104b and because the term "CITIZEN" is associated with the zip code in the context data 106.

The transcription selector 112 selects a particular candidate transcription for output from the initial candidate transcription 104c and the additional candidate transcription 104d that represents the candidate transcription that is most likely to represent an accurate transcription. For instance, the transcription selector 112 may compare the confidence score assigned to each of the initial candidate transcription 104c and the additional candidate transcription 104d and select the particular candidate transcription with the higher confidence score. As shown in the example in FIG. 1, the transcription selector chooses the additional candidate transcription 104d for output based on the additional candidate transcription 104d having a higher confidence score given the context data 106 indicating the current location of the user 102. The ASR 110 then provides the recognition output 104e as "CITYSIN" based on selecting the additional candidate transcription 104d.

In some implementations, the ASR 110 may additionally include the re-scorer 114, which rescores the confidence scores calculated by ASR 110 for each particular candidate transcription. For instance, the re-scorer 114 may additionally compare the phonetic similarity between each of candidate transcription and the audio data 104b to determine which individual candidate transcription represents the transcription that is most likely to be the correct transcription. For example, if the audio data 104b includes significant amounts of noise, the re-scorer 114 may adjust the confidence scores assigned to each of the initial candidate transcription 104c and the additional candidate transcription 104d such that the ASR 110 appropriately select the candidate transcription that is most likely to be an accurate transcription.

Figure 2:
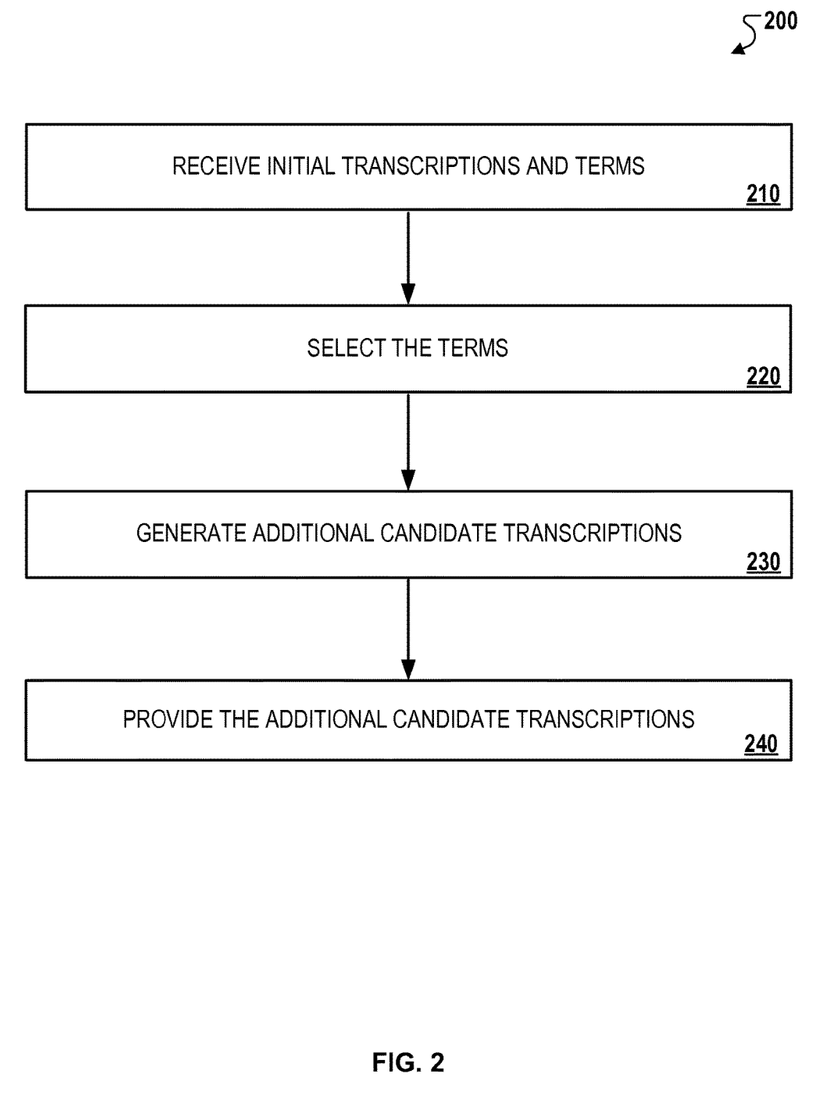
FIG. 2 illustrates an exemplary process for context-based voice query recognition.

FIG. 2 illustrates an exemplary process 200 for context-based voice query recognition. Briefly, the process 200 may include receiving initial transcriptions and terms (210), selecting the terms (220), generating additional candidate transcriptions (230), and providing the additional candidate transcriptions (240).

In more detail, the process 200 may include receiving initial transcriptions and terms (210). For example, the candidate transcription expander 120 may obtain one or more initial candidate transcriptions 104c and one or more terms that are associated with a context indicated by the context data 106. In some instances, the context may be extracted from previous user sessions such as, for example, previous search queries, search engine results, answers to voice queries. In other instances, the context may be extracted from user activity data such as screen tracking data, recently clicked hyperlinks, or user profiles indicating preferences. The context may additionally or alternatively include a current user location and terms associated with the user location such as names of nearby locations, or common queries submitted by the user 102 or other users within the specified location.

The process 200 may include selecting the terms (220). For example, the term determiner 122 may select one or more of the terms that are associated with the context data 106, and that do not occur in the candidate transcriptions 104c, and are indicated as phonetically similar to one or more terms that do occur in the initial candidate transcriptions 104c. The term determiner 122 may select the terms based on the context mapping 132, which maps particular terms to a particular context. The term determiner 122 may initially compare the terms included in the context mapping 132 to the terms included in the initial candidate transcription 104c to determine which of the terms included in the context mapping 132 are phonetically similar to the terms included in the initial candidate transcription 104c but are not included in the initial candidate transcription 104c.

The process 200 may include generating additional candidate transcriptions (230). For example, the transcription generator 124 may generate one or more additional candidate transcriptions 104d based on the initial candidate transcriptions 104c and the selected terms. The transcription generator 124 may receive the terms selected by the term determiner 122 and then generate additional candidate transcriptions 104d that include the selected terms.

In some instances, the additional candidate transcriptions 104d may be alternative speech hypotheses for the voice query 104a based on the initial candidate transcription 104c that are initially determined by the ASR 110 and then restored after receiving the context data 106 indicating that the additional candidate transcriptions 104d may be more relevant to a particular context indicated by the context data 106. In other instances, the additional candidate transcriptions 104d may be corrections to the initial candidate transcription 104c for a voice query that often include misrecognized transcriptions as shown in FIG. 1. In such instances, the context data 106 may be used to distinguish between phonetically similar terms that are included in the voice query 104a used to generate multiple candidate transcriptions.

The process 200 may include providing the additional candidate transcriptions (240). For example, the candidate transcription expander 120 may provide the one or more additional candidate transcriptions 104d to the ASR 110. The additional candidate transcriptions 104d may be used by the ASR 110 to generate the recognition output 104e.

Figure 3:
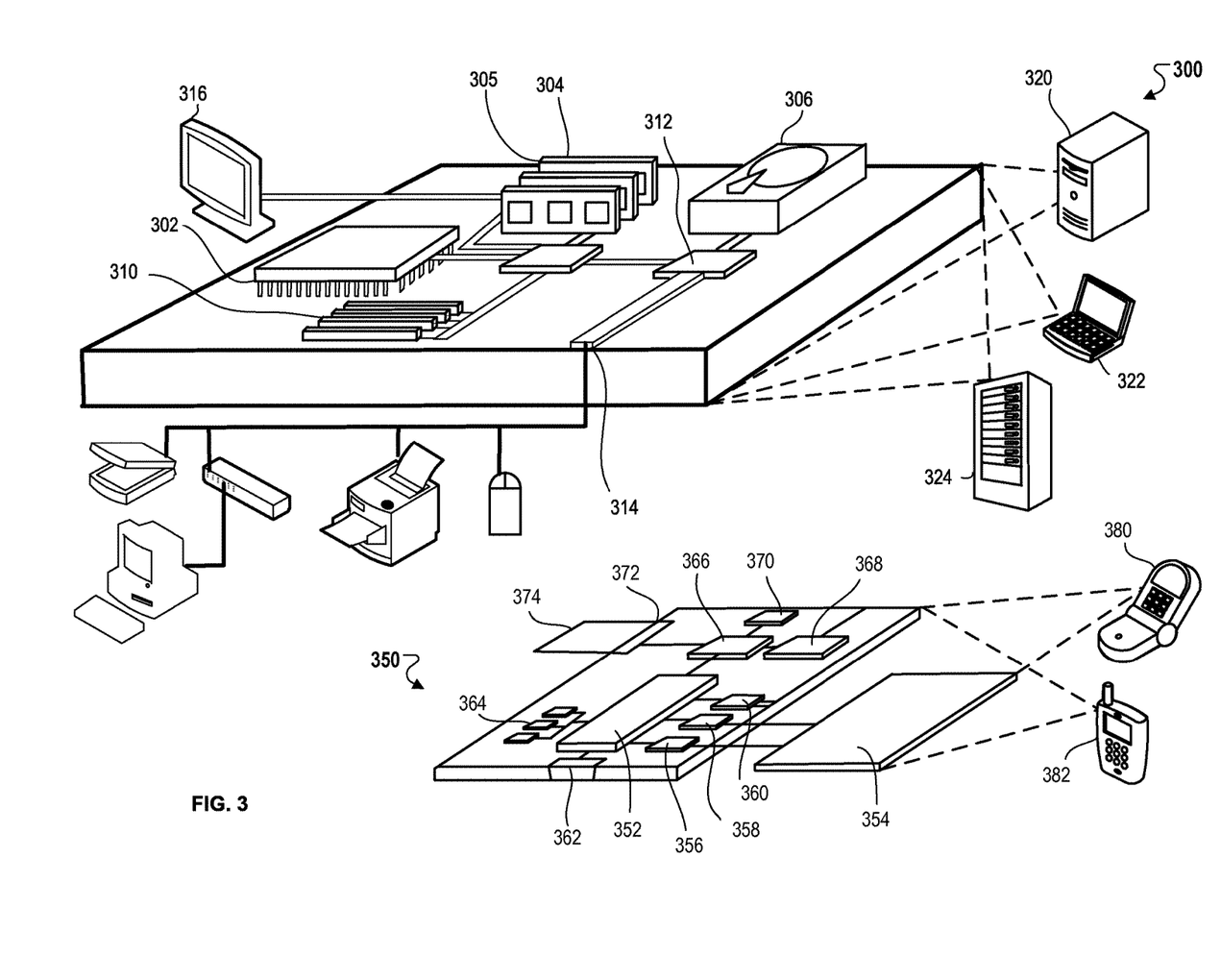
FIG. 3 is a block diagram of computing devices on which the processes described herein, or potions thereof, may be implemented.

FIG. 3 is a block diagram of computing devices 300, 350 that may be used to implement the systems and methods described in this document, as either a client or as a server or plurality of servers. Computing device 300 is intended to represent various forms of digital computers, such as laptops, desktops, workstations, personal digital assistants, servers, blade servers, mainframes, and other appropriate computers. Computing device 350 is intended to represent various forms of mobile devices, such as personal digital assistants, cellular telephones, smartphones, and other similar computing devices. Additionally computing device 300 or 350 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations, e.g., as a server bank, a group of blade servers, or a multi-processor system.

The memory 304 stores information within the computing device 300. In one implementation, the memory 304 is a volatile memory unit or units. In another implementation, the memory 304 is a non-volatile memory unit or units. The memory 304 may also be another form of computer-readable medium, such as a magnetic or optical disk.

The storage device 306 is capable of providing mass storage for the computing device 300. In one implementation, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 304, the storage device 306, or memory on processor 302.

The high speed controller 308 manages bandwidth-intensive operations for the computing device 300, while the low speed controller 312 manages lower bandwidth intensive operations. Such allocation of functions is exemplary only. In one implementation, the high-speed controller 308 is coupled to memory 304, display 316, e.g., through a graphics processor or accelerator, and to high-speed expansion ports 310, which may accept various expansion cards (not shown). In the implementation, low-speed controller 312 is coupled to storage device 306 and low-speed expansion port 314. The low-speed expansion port, which may include various communication ports, e.g., USB, Bluetooth, Ethernet, wireless Ethernet may be coupled to one or more input/output devices, such as a keyboard, a pointing device, microphone/speaker pair, a scanner, or a networking device such as a switch or router, e.g., through a network adapter. The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as device 350. Each of such devices may contain one or more of computing device 300, 350, and an entire system may be made up of multiple computing devices 300, 350 communicating with each other.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as device 350. Each of such devices may contain one or more of computing device 300, 350, and an entire system may be made up of multiple computing devices 300, 350 communicating with each other.

Computing device 350 includes a processor 352, memory 364, and an input/output device such as a display 354, a communication interface 366, and a transceiver 368, among other components. The device 350 may also be provided with a storage device, such as a microdrive or other device, to provide additional storage. Each of the components 350, 352, 364, 354, 366, and 368, are interconnected using various buses, and several of the components may be mounted on a common motherboard or in other manners as appropriate.

The processor 352 can execute instructions within the computing device 350, including instructions stored in the memory 364. The processor may be implemented as a chipset of chips that include separate and multiple analog and digital processors. Additionally, the processor may be implemented using any of a number of architectures. For example, the processor 310 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 350, such as control of user interfaces, applications run by device 350, and wireless communication by device 350.

Processor 352 may communicate with a user through control interface 358 and display interface 356 coupled to a display 354. The display 354 may be, for example, a TFT (Thin-Film-Transistor Liquid Crystal Display) display or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may be provide in communication with processor 352, so as to enable near area communication of device 350 with other devices. External interface 362 may provide, for example, for wired communication in some implementations, or for wireless communication in other implementations, and multiple interfaces may also be used.

The memory 364 stores information within the computing device 350. The memory 364 can be implemented as one or more of a computer-readable medium or media, a volatile memory unit or units, or a non-volatile memory unit or units. Expansion memory 374 may also be provided and connected to device 350 through expansion interface 372, which may include, for example, a SIMM (Single In Line Memory Module) card interface. Such expansion memory 374 may provide extra storage space for device 350, or may also store applications or other information for device 350. Specifically, expansion memory 374 may include instructions to carry out or supplement the processes described above, and may include secure information also. Thus, for example, expansion memory 374 may be provide as a security module for device 350, and may be programmed with instructions that permit secure use of device 350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352 that may be received, for example, over transceiver 368 or external interface 362.

Device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver (not shown). In addition, GPS (Global Positioning System) receiver module 370 may provide additional navigation- and location-related wireless data to device 350, which may be used as appropriate by applications running on device 350.

Device 350 may also communicate audibly using audio codec 360, which may receive spoken information from a user and convert it to usable digital information. Audio codec 360 may likewise generate audible sound for a user, such as through a speaker, e.g., in a handset of device 350. Such sound may include sound from voice telephone calls, may include recorded sound, e.g., voice messages, music files, etc. and may also include sound generated by applications operating on device 350.

The computing device 350 may be implemented in a number of different forms, as shown in the figure. For example, it may be implemented as a cellular telephone 480. It may also be implemented as part of a smartphone 382, personal digital assistant, or other similar mobile device.

Various implementations of the systems and methods described here can be realized in digital electronic circuitry, integrated circuitry, specially designed ASICs (application specific integrated circuits), computer hardware, firmware, software, and/or combinations of such implementations.

These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
obtaining (i) one or more initial candidate transcriptions for an utterance that are output by an automated speech recognizer, and (ii) one or more alternate terms that are associated with a context of a user of a mobile device;
selecting one or more of the alternate terms that are associated with the context of the user of the mobile device, and that (i) do not occur in the initial candidate transcriptions that are output by the automated speech recognizer, and (ii) are indicated as phonetically similar to one or more terms that do occur in the initial candidate transcriptions that are output by the automated speech recognizer;
generating one or more additional candidate transcriptions based on (i) the initial candidate transcriptions that are output by the automated speech recognizer, and (ii) the selected alternate terms; and
providing the one or more additional candidate transcriptions to the automated speech recognizer;
generating, by the automated speech recognizer, a final speech recognition hypothesis that corresponds to the utterance using the one or more additional candidate transcriptions.

2. The method of claim 1, wherein the context of the user of the mobile device comprises a user location.

3. The method of claim 2, wherein the one or more alternate terms associated with the user location includes entity terms representing names of locations.

4. The method of claim 1, wherein the one or more alternate terms that are associated with the context of the user of the mobile device include entity terms that are included in one or more previously submitted queries.

5. The method of claim 1, comprising:
generating a score for each of the initial candidate transcriptions and the additional candidate transcriptions based on the utterance;
selecting a particular candidate transcription, from among the initial candidate transcriptions and the additional candidate transcriptions, based at least on the score; and
biasing, by the automated speech recognizer, speech recognition of the utterance using the particular candidate transcription.

6. The method of claim 1, wherein the one or more additional candidate transcriptions include corrected transcriptions for each of the one or more candidate transcriptions that are identified as incorrect transcriptions for the utterance.

7. The method of claim 1, wherein selecting one or more of the alternate terms that are associated with the context of the user of the mobile device, comprises:
comparing waveforms associated with one or more of the alternate terms that are associated with the context of the user of the mobile device and waveforms associated with one or more of the terms that occur in the initial candidate transcriptions; and
determining, based on comparing waveforms associated with one or more of the alternate terms that are associated with the context of the user of the mobile device and waveforms associated with one or more of the terms that occur in the initial candidate transcriptions, that the one or more alternate terms that are associated with the context of the user of the mobile device are phonetically similar to one or more terms that occur in the initial candidate transcriptions.

8. A computer-implemented method comprising:
  obtaining (i) audio data encoding an utterance, and (ii) data indicating a context of a user of a mobile device;
  obtaining one or more initial candidate transcriptions from an automated speech recognizer based on the audio data;
  obtaining one or more alternate terms that are associated with the context of the user of the mobile device;
  selecting one or more of the alternate terms that are associated with the context of the user of the mobile device, and that (i) do not occur in the initial candidate transcriptions that are output by the automated speech recognizer, and (ii) are indicated as phonetically similar to one or more terms that do occur in the initial candidate transcriptions that are output by the automated speech recognizer;
  generating one or more additional candidate transcriptions based on the (i) initial candidate transcriptions that are output by the automated speech recognizer, and (ii) the selected alternate terms;
  providing the one or more additional candidate transcriptions to the automated speech recognizer;
  selecting, by the automated speech recognizer, a particular candidate transcription that corresponds to the utterance
    from among the initial candidate transcriptions that are output by the automated speech recognizer and the additional candidate transcriptions; and
  providing the particular candidate transcription for output.

9. The method of claim 8, wherein the context of the user of the mobile device comprises (i) a user location, or (ii) one or more terms associated with the user location.

10. The method of claim 9, wherein the one or more alternate terms associated with the user location includes an entity term representing a name of a location.

11. The method of claim 8, wherein the one or more alternate terms that are associated with the context of the user of the mobile device include entity terms that are included in one or more previously submitted queries.

12. The method of claim 8, comprising:
  biasing, by an automated speech recognizer, speech recognition of the utterance using the particular candidate transcription.

13. The method of claim 8, wherein the one or more additional candidate transcriptions include corrected transcriptions for each of the one or more candidate transcriptions that are identified as incorrect transcriptions for the utterance.

14. A computer-implemented method comprising:
  obtaining, by an automated speech recognizer, audio data encoding an utterance;
  obtaining, by the automated speech recognizer, one or more initial candidate transcriptions for the utterance based on the audio data;
  transmitting, by the automated speech recognizer, the one or more initial candidate transcriptions for the utterance;
  in response to transmitting the one or more initial candidate transcriptions for the utterance, receiving, by the automated speech recognizer, one or more additional candidate transcriptions that each include an alternate term that (i) does not occur in the candidate transcriptions that are output by the automated speech recognizer, and (ii) are indicated as phonetically similar to one or more terms that do occur in the initial candidate transcriptions that are output by the automated speech recognizer;
  after receiving the one or more additional candidate transcriptions, generating, by the automated speech recognizer, a score for each of the initial candidate transcriptions and the additional candidate transcriptions based on the audio data;
  selecting, by the automated speech recognizer, a particular candidate transcription, from among the initial candidate transcriptions and the additional candidate transcriptions, based at least on the score; and
  providing, by the automated speech recognizer, the particular candidate transcription for output.

15. The method of claim 14, wherein the additional candidate transcriptions do not represent an output of the automated speech recognizer.

16. The method of claim 14, comprising:
  biasing, by an automated speech recognizer, speech recognition of the utterance using the particular candidate transcription.

17. The method of claim 14, wherein the one or more additional candidate transcriptions include corrected transcriptions for each of the one or more candidate transcriptions that are identified as incorrect transcriptions for the utterance.

18. The method of claim 14, wherein the alternate term that (i) does not occur in the candidate transcriptions, and (ii) is indicated as phonetically similar to one or more terms that do occur in the initial candidate transcriptions represents an entity term.

19. The method of claim 14, wherein selecting the particular candidate transcription from among the initial candidate transcriptions and the additional candidate transcriptions, comprises:
  comparing the score for each of the initial candidate transcriptions and the additional candidate transcriptions;
  determining, based at least on comparing the score for each of the initial candidate transcriptions and the additional candidate transcriptions, that a score for a particular candidate transcription indicates a higher likelihood than the score for each of the initial candidate transcriptions that the particular candidate transcription represents an accurate transcription of the audio date; and
  selecting the particular transcription for output.

* * * * *